`3,839,545`
EXHAUST GAS PURIFICATION CATALYST AND METHOD THEREFOR
Georg-Maria Schwab, Munich, and Gunter Donga, Moosburg, Germany, assignors to Sud-Chemie AG
No Drawing. Filed Mar. 1, 1971, Ser. No. 119,831
Claims priority, application Germany, Mar. 5, 1970, P 20 10 449.8
Int. Cl. B01j 11/06, 11/32, 11/40
U.S. Cl. 423—437      15 Claims

ABSTRACT OF THE DISCLOSURE

Improved catalyst for purifying exhaust gases such as those from internal combustion engines by accelerating the combustion of carbon monoxide and hydrocarbons comprising a mixture of copper oxide and manganese oxide as the active catalyst mass and as promoters therefor, silicon dioxide and/or one or more oxides of Group IV elements. The active catalyst mass may also contain additional oxides such as the oxides of iron, silver, cobalt and lead.

BACKGROUND

This invention relates to an improved catalyst for purifying exhaust gases such as those for internal combustion engines and to a method for preparing such catalyst.

It is known that mixtures of the oxides of copper and manganese are capable of accelerating the combustion of carbon monoxide and of hydrocarbons by catalysis. It is furthermore known that a small addition of potassium oxide appreciably diminishes the precipitation of carbon which forms on the catalyst in the presence of hydrocarbons as a result of cracking processes.

In addition to the pure oxides, a catalyst is often used which consists of a support material that is coated with the above-named oxides. This results not only in a saving of oxide material but also an improvement in mechanical properties. Available support materials are granules of hard, very porous substances, such as baked clay, aluminum oxide, etc. Such a supported catalyst is described, for example, in German Patent 1,299,606.

In the attempt to use such catalysts for the afterburning of toxic components in exhaust gases, especially motor exhaust gases, it has been found that the catalyst temperatures necessary for the achievement of a satisfactory purifying effect are too high. Also, the hydrocarbons cannot be burned quantitatively with these catalysts, especially if one is to satisfy the requirement of maximum combustion shortly after the cold starting of a motor vehicle.

SUMMARY

It has now surprisingly been found that the required properties are achieved if oxides of certain tetravalent elements are added to the catalyst.

The subject of the invention is a catalyst for the purification of exhaust gases, especially of exhaust gases of internal combustion engines, with an active mass of a copper oxide-manganese dioxide mixture containing, if desired, additional oxides such as iron oxide, silver oxide, cobalt oxide and/or lead oxide, which is characterized in that the active mass contains silicon dioxide and/or one or more oxides of elements of the Fourth Subgroup of the Periodic System as promoters.

DESCRIPTION

The catalyst is intended for use especially for the purification of the exhaust gases of internal combustion engines; it is also, however, generally suitable for the purification of other exhaust gases containing carbon monoxide and/or hydrocarbons, e.g., for the purification of furnace exhaust gases.

The active mass of copper oxide and managanese dioxide is in the prior art. The ratio between the copper oxide and manganese dioxide generally amounts to about 2:1 to 1:2, preferably about 3:2 to 2:3. In addition to copper oxide and manganese dioxide, the active mass may also contain the oxides of other elements, such as iron, cobalt, silver and/or lead. The addition of lead oxide reduces the sensitivity of the catalysts to lead poisoning.

The promoter oxides are preferably the oxides of titanium, zirconium and/or thorium, thorium oxide having the best effect. The promoting action is probably connected with the ion radius of the promoter element.

The quantity of the promoter oxides can vary widely. Usually the quantity of promoter oxides amounts to about 1 to 15 mole-percent, preferably about 6 to 12 mole-percent, with reference to the oxides of the active mass.

The supporting materials can be any hard, porous supporting materials, the hardness being especially important in the case of catalysts for the purification of the exhaust gases of internal combustion engines, since these catalysts are subject to mechanical shock from the exhaust gases, and from the vibration of the motor and of the road. Porosity is important so as to enable the support to absorb enough of the active mass and the promoter oxide.

Examples of supports are $\alpha$ and $\gamma$ aluminum oxide, aluminum silicates, silicon dioxide (also with a small $Al_2O_3$ content), magnesium oxide, and other such substances.

Preferably the catalysts contain alkali oxides and/or alkaline earth oxides, such as sodium oxide, potassium oxide or barium oxide, usually in amounts of about 1 to 10 atom-percent, preferably in amounts of about 6 to 7 atom-percent, with reference to the metals of the active mass. These oxides prevent the precipitation of carbon and hence the inactivation of the catalysts. Furthermore, barium oxide causes a cleavage of the nitric oxide contained in the exhaust gases.

The invention furthermore concerns a process for the preparation of the supported catalyst of the invention; the process is characterized in that the active mass and the promoter oxides are applied to a hard, porous support.

Preferably, the promoter oxides are applied together with the active mass to the support, the promoter oxides and the oxides of the active mass being able to be applied to the support by calcining their decomposable salts in the presence of the support.

It is desirable to impregnate the support with a solution of the decomposable salts of the promoter elements and of the elements of the active mass, and then to heat the impregnated support until the decomposable salts are calcined. Nitrates are the preferred salts.

Preferably the catalyst is treated with alkali salts or alkaline earth salts for the purpose of applying the above-named oxides. The calcination can also be performed in a reducing atmosphere, e.g., in the exhaust gas itself.

To test the catalytic activity of the catalysts of the invention a determination was made of the percentage of the carbon monoxide and hexane (as representing the hydrocarbons) eliminated by oxidation from a test gas consisting of air containing 5% by volume CO and 1400 p.p.m. of hexane, at a volumetric rate of 2400 liters of gas per liter of catalyst per hour at different temperatures.

The determination was performed by means of the pulse method, which permits a precise correlation of catalyst temperature and degree of combustion, since it excludes the axial and radial temperature change (overheating) produced in the catalyst charge by the reaction heat during the measuring procedure and thus forestalls the illusion of activities higher than they actually are.

The measurement of the concentration of carbon monoxide and hexane ahead of and behind the catalyst was performed with infrared gas analyzers, and the catalyst temperature was recorded by means of NiCr-Ni thermocouples attached to a temperature recorder of high recording accuracy.

The catalysts and process of the invention will be further illustrated by the following examples.

In the examples, an aluminum silicate support and a silicon dioxide support containing $Al_2O_3$ were used (K 306 and KA, respectively, commercial products of Süd-Chemie AG). These supporting materials have the following average chemical composition:

K 306: Percent
$SiO_2$ ---- 72
$Al_2O_3$ ---- 12
$Fe_2O_3$ ---- 5
CaO ---- 3
MgO ---- 4
Calcination loss ---- 4

KA:
$SiO_2$ ---- 93
$Al_2O_3$ ---- 4
$Fe_2O_3$ ---- 1
Calcination loss ---- 2

Both support materials had been screened to have a particle size between 2 and 2.5 mm.

Coating with the oxides was performed by impregnating the support material with the solution, saturated at elevated temperature, of the corresponding nitrates, and then pyrolyzing it at 500° C. Potassium and sodium were usually added in nitrate form to the solution of the other nitrates, with the exception of the sodium in Catalyst No. 5 of Table 1; in this case it was added together with silicon in the form of the sodium silicate $Na_2SiO_3 \cdot 5H_2O$.

In the following comparison (Table 1) of those catalysts whose activity will be described in the next section, the support material and the composition of the impregnating solution (in mole-percent) is listed for each catalyst. The oxide content (active mass) in the finished catalyst was between 28 and 34% by weight. Catalysts having lower oxide contents are also suitable for the oxidation of CO and hydrocarbons.

TABLE 1

| Catalyst number | Support | Impregnating solution percent | | | Additive, percent |
| --- | --- | --- | --- | --- | --- |
| | | Mn | Cu | K | |
| 1 | KA | 55 | [1]38 | 7 | |
| 2 | K 306 | 55 | [1]38 | 7 | |
| 3 | KA | 52 | [1]36 | 6 | 6 Th |
| 4 | KA | 55 | [1]38 | 6 | 1 Th |
| 5 | KA | 53.1 | [1]37 | ([3]) | 3.3 Si |
| 6 | KA | 52 | [1]36 | 6 | 6 Zr |
| 7 | K 306 | 49 | [1]34 | 6 | 11 Th |
| 8 | KA | 49 | [1]34 | 6 | 11 Th |
| 9 | KA | [1]49 | [1]34 | 6 | 11 Th [2] |

[1] Technical Mn or Cu nitrate, as the case may be.
[2] Technical Th nitrate (Aurer-Remy) containing approx. 40 wt.-percent Th.
[3] 6.6 Na.

With the exception of the copper nitrate, which is of good purity even as a technical salt, salts of analytical quality are generally used. Catalyst 9, however, was prepared using only cheap technical salts for the purpose of determining what effect, if any, impurities have on the activity.

The results of the combustion tests are given in Table 2 below. The degree of combustion (percentage of reduction of the initail concentration of 5% CO by volume and 1400 p.p.m. of hexane) is listed under the catalyst temperature $T_k$ (° C.). To clarify the relationships, the catalysts are arranged in groups, some of them appearing simultaneously in more than one group. Included in the listing for purposes of comparison is Catalyst 10, a noble-metal catalyst composed of 0.1% platinum on an alumina support.

TABLE 2

| | Catalyst | Gas component | Percent of combustion at $T_k$ (° C.) | | | | | | | |
| --- | --- | --- | --- | --- | --- | --- | --- | --- | --- | --- |
| | | | 20 | 50 | 100 | 150 | 200 | 250 | 300 | 350 |
| Group I | 1 | CO | 0 | 3 | 29 | 91 | 100 | | | |
| | | Hexane | | 0 | 1 | 16 | 51 | 91 | 100 | |
| | 5 | CO | 0 | 5 | 36 | 97 | 100 | | | |
| | | Hexane | | 0 | 5 | 32 | 80 | 98 | 100 | |
| | 6 | CO | 0 | 12 | 79 | 100 | | | | |
| | | Hexane | | 0 | 7 | 41 | 89 | 99 | 100 | |
| | 3 | CO | 3 | 34 | 99 | 100 | | | | |
| | | Hexane | | 0 | 14 | 60 | 95 | 100 | | |
| | [1]10 | CO | | 0 | 4 | 1 | 4 | 100 | | |
| | | Hexane | | | 82 | 98 | 99 | 100 | | |
| Group II | 1 | CO | 0 | 3 | 29 | 91 | 100 | | | |
| | | Hexane | | 0 | 1 | 16 | 51 | 91 | 100 | |
| | 4 | CO | 0 | 14 | 76 | 100 | | | | |
| | | Hexane | | 0 | 5 | 28 | 70 | 96 | 100 | |
| | 3 | CO | 3 | 34 | 99 | 100 | | | | |
| | | Hexane | | 0 | 14 | 60 | 95 | 100 | | |
| | 8 | CO | 2 | 24 | 99 | 100 | | | | |
| | | Hexane | | 0 | 15 | 64 | 97 | 100 | | |
| | 9 | CO | 2 | 20 | 98 | 100 | | | | |
| | | Hexane | | 0 | 13 | 57 | 97 | 100 | | |
| Group III | 1 | CO | 0 | 3 | 29 | 91 | 100 | | | |
| | | Hexane | | 0 | 1 | 16 | 51 | 91 | 100 | |
| | 8 | CO | 2 | 24 | 99 | 100 | | | | |
| | | Hexane | | 0 | 15 | 64 | 97 | 100 | | |
| | 2 | CO | 0 | 1 | 15 | 71 | 99 | 100 | | |
| | | Hexane | | 0 | 2 | 23 | 86 | 98 | 100 | |
| | 7 | CO | 1 | 7 | 55 | 98 | 100 | | | |
| | | Hexane | | 0 | 11 | 66 | 99 | 100 | | |

[1] For comparison.

The results can be interpreted as follows:

(a) Catalyst 1 (without promoter oxides) forms the basis for the testing of the various additives. Its activity is the point of reference for their evaluation.

(b) Group I of Table 2 starts with undoped Cu-MN-K catalyst and contains the catalysts with the additives silicon dioxide, zirconium oxide and thorium oxide, plus a noble-metal catalyst. It is clearly apparent that these tetravalent elements are suitable promoters, and the higher their atomic weight is, the more effective they are. A comparison between Catalysts 1 and 3 is especially convincing: the activity of the catalysts is improved considerably as regards the combustion of hexane by the addition of 6 mole-percent of thorium, and as regards the combustion of CO it is improved to such an extent that the oxidation sets in even at room temperature and is virtually complete at 100° C.

A catalyst containing 0.1% platinum proves to be somewhat more effective as regards hydrocarbon combustion, but its CO oxidation takes place at substantially higher temperatures. In practical use (in the afterburning system of a motor vehicle, for example), the thorium-doped catalyst heats up from the fully cooled state much more rapidly, owing to the early start of the CO combustion due to the extremely low "start-up" temperature of 20° C., than does the platinum catalyst. It must therefore be assumed that the thorium-doped catalyst, though it at first seemed inferior as regards hexane combustion, always burns more hydrocarbons than the platinum catalyst in a cold start, owing to this more rapid temperature rise. Furthermore, the platinum catalyst is very rapidly poisoned by the sulfur contained in the exhaust gas.

(c) In Group II of Table 2, the thorium-doped catalysts are listed in order of increasing thorium content. It can be seen that the activity promoting action clearly starts with a content of as little as 1 mole-percent, and reaches its maximum at relatively low temperatures in the still low range of between 6 and 12 mole-percent. These thorium contents are therefore adequate for practical purposes. Of course, the thorium content can be still further increased, if this should be necessary.

Comparison between Catalysts 8 and 9 shows that the considerably cheaper technical salts are well suited for the production of such catalysts, although the thorium content should not be much lower than that of Catalyst 9 on account of the visibly varying quality of such salts.

(d) From the results in Group III of Table 2 it can be seen that the activity promoting action of thorium is found also in catalyst on support K 306 (cf. Catalysts 2 and 7); it is fully present as regards hexane combustion, and it is present as regards CO combustion to a lesser extent than is the case when support KA is used. This is in harmony with the fact that even the undoped Catalysts 1 and 2 display the same differences in their activity.

The examples show that the catalysts of the invention containing the oxides of the elements silicon, zirconium and thorium as promoters have an extremely low "start-up" temperature even in quantities of only 6 to 12 mole-percent, and are especially well suited for the afterburning of automobile exhaust gases precisely under cold-start conditions. They can be manufactured with inexpensive technical salts. Nevertheless they are substantially superior to the more expensive and delicate noble-metal catalysts.

What is claimed is:

1. Supported exhaust gas purification catalyst comprising as the active mass a mixture of copper oxide and manganese dioxide and at least one promoter oxide of the elements of Group IV or thorium.

2. Supported catalyst of Claim 1 wherein said active mass contains one or more oxides of titanium, zirconium or thorium as promoters.

3. Supported catalyst of Claim 1 wherein the quantity of the promoter oxides amounts to approximately 1 to 15 mole-percent based on the active mass.

4. Supported catalyst of Claim 1 wherein said active mass contains additional oxides selected from the group of oxides of iron, silver, cobalt and lead.

5. Supported catalyst of Claim 1 containing alkali oxides and/or alkaline earth oxides, in quantities of about 1 to 10 atomic percent based on the active mass.

6. Process for the preparation of the supported catalyst of Claim 1 which comprises applying to a hard porous support an active mass consisting essentially of a mixture of copper oxide and manganese oxide, applying to said hard porous support a source of an oxide of an element of Group IV of the Periodic Table or thorium and thereafter calcining the support.

7. Process of Claim 6, wherein the promoter oxides are applied together with the active mass to the support.

8. Process of Claim 6, wherein the promoter oxides and the oxides of the active mass are applied to the support by calcining their decomposable salts in the presence of the support.

9. Process of Claim 6, wherein the support is impregnated with a solution of the decomposable salts of the promoter elements and of the elements of the active mass, and the impregnated support is heated until the decomposable salts are calcined.

10. Process of Claim 6, wherein the catalyst is treated with alkalies and/or alkaline earths.

11. A supported exhaust gas purification catalyst comprising as the active mass a mixture of copper oxide and manganese oxide, a support consisting essentially of silicon dioxide, said catalyst promoted with an oxide of Group IV of the Periodic Table or thorium.

12. A supported exhaust gas purification catalyst according to Claim 11 wherein the support contains alumina.

13. A process for converting carbon monoxide to carbon dioxide, said carbon monoxide in admixture with hydrocarbons and emanating from the exhaust of an internal combustion engine which comprises contacting said exhaust with a supported exhaust gas purification catalyst of Claim 1.

14. A process for oxidizing carbon monoxide to carbon dioxide in an exhaust from an internal combustion engine containing hydrocarbons which comprises contacting said exhaust with a catalyst of Claim 11.

15. A process for oxidizing carbon monoxide to carbon dioxide, said carbon monoxide being in admixture with hydrocarbons and emanating as the exhaust from an internal combustion engine which comprises contacting said exhaust with a catalyst composition of Claim 12.

References Cited
UNITED STATES PATENTS

| | | | |
|---|---|---|---|
| 3,429,656 | 2/1969 | Taylor et al. | 252—454 X |
| 2,061,470 | 11/1936 | Larson | 252—454 X |
| 2,841,603 | 7/1958 | Zellner et al. | 252—471 X |
| 3,637,820 | 1/1972 | Dodman et al. | 252—471 X |
| 2,433,932 | 1/1948 | Stosick | 252—471 X |
| 3,460,523 | 8/1969 | Stiles et al. | 252—454 X |
| 3,493,325 | 2/1970 | Roth | 252—471 X |

DANIEL E. WYMAN, Primary Examiner

P. F. SHAVER, Assistant Examiner

U.S. Cl. X.R.

252—454, 459, 455 R, 471; 423—212